United States Patent [19]

Buyan et al.

[11] Patent Number: 4,808,383
[45] Date of Patent: Feb. 28, 1989

[54] FCC REACTOR MULTI-FEED NOZZLE SYSTEM

[75] Inventors: Frank M. Buyan, Yardley, Pa.; Mark S. Ross, Lawrenceville, N.J.

[73] Assignee: Mobil Oil Corporation, New York, N.Y.

[21] Appl. No.: 794,801

[22] Filed: Nov. 4, 1985

Related U.S. Application Data

[63] Continuation of Ser. No. 615,485, May 30, 1985, Pat. No. 4,650,566.

[51] Int. Cl.$^4$ .............................................. B01J 8/18
[52] U.S. Cl. ................................... 422/140; 422/145; 422/214; 136/230
[58] Field of Search ...................... 422/140, 145, 214; 136/230

[56] References Cited

U.S. PATENT DOCUMENTS

| | | | |
|---|---|---|---|
| 2,629,653 | 2/1953 | Barr | 422/144 |
| 3,152,065 | 10/1964 | Sharp et al. | 422/214 |
| 4,028,139 | 6/1977 | Smith et al. | 136/230 |
| 4,532,026 | 7/1985 | Fries | 208/164 |
| 4,640,463 | 2/1987 | Krambeck et al. | 239/424 |

FOREIGN PATENT DOCUMENTS

| | | |
|---|---|---|
| 0000433 | 1/1979 | European Pat. Off. |
| 0151882 | 8/1985 | European Pat. Off. |
| 1048937 | 11/1966 | United Kingdom |

*Primary Examiner*—Barry S. Richman
*Assistant Examiner*—Timothy M. McMahon
*Attorney, Agent, or Firm*—Alexander J. McKillop; Michael G. Gilman; Malcolm D. Keen

[57] ABSTRACT

A method and apparatus for feeding catalyst, oil and steam into a fluid catalytic cracking (FCC) riser. Oil passes through respective oil lines into a multiplicity of upwardly extending nozzles located at a lower portion of the riser, while steam passes through respective steam lines into the nozzles where it blends with the oil, with the combined oil and steam mixture being fed through the nozzles into the riser. Each oil line and steam line is provided with a valve to separately control oil and steam flow rates, respectively, in each of the nozzles to obtain a substantially constant catalyst to oil ratio across a horizontal cross-section of the riser. The substantially constant catalyst to oil ratio is represented by a substantially isothermal temperature profile across the horizontal riser cross-section, which is detected by measuring the temperature at various points along the horizontal cross-section. The oil and stem flow rates are adjusted by means of the valves until the isothermal temperature profile is achieved.

6 Claims, 3 Drawing Sheets

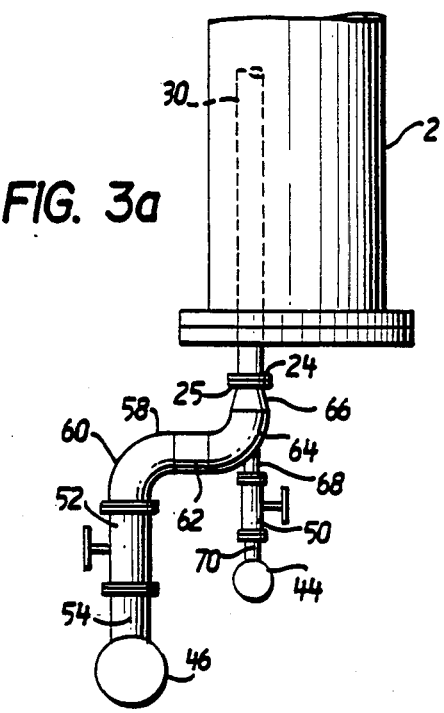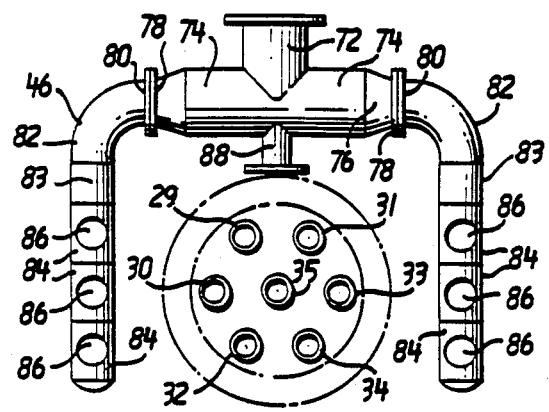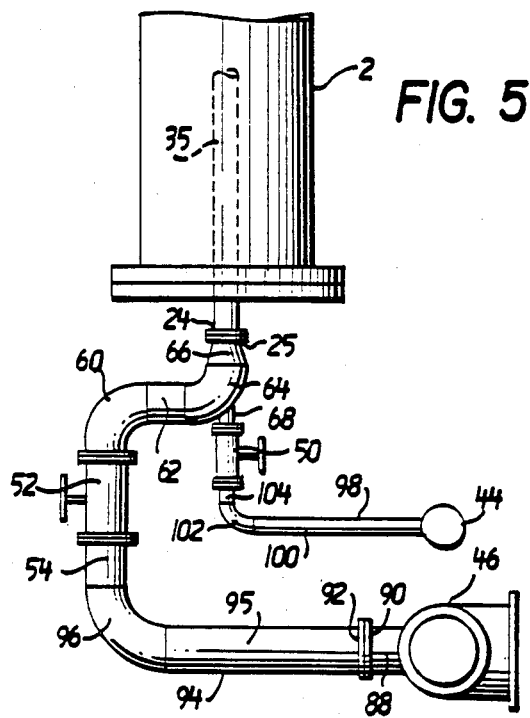

BASE CASE—
UNADJUSTED

1-STANDARD CONDITION
OPTIMUM CONTROL

FCC REACTOR MULTI-FEED NOZZLE SYSTEM

CROSS REFERENCE TO RELATED APPLICATION

This is a division of application Ser. No. 615,485 filed May 30, 1984.

BACKGROUND OF THE INVENTION

1. Field of the Invention

This invention relates to a method and apparatus for fluid catalytic cracking (FCC) of a hydrocarbon feed in a reactor having a multi-feed nozzle system. More particularly, it relates to an improved method and apparatus for individually controlling the feed of oil and steam to each of a plurality of nozzles of a multi-feed nozzle system to achieve a more uniform ratio of catalyst and oil across a cross-section of an FCC riser.

2. Discussion of the Prior Art

The field of catalytic cracking, particularly fluid catalytic cracking, has undergone significant developments due primarily to advances in catalyst technology and product distribution obtained therefrom. With the advent of high activity catalysts and particularly crystalline zeolite cracking catalysts, new areas of operating technology have been encountered, requiring refinements in processing techniques to take advantage of the high catalyst activity, selectivity and operating sensitivity.

By way of background, the hydrocarbon conversion catalyst usually employed in an FCC installation is preferably a high activity crystalline zeolite catalyst of a fluidizable particle size. The catalyst is combined with hydrocarbon feed (oil) and steam and is transferred in suspended or dispersed phase condition generally upwardly through one or more conversion zones (FCC riser), providing a hydrocarbon residence time in each conversion zone in the range of 0.5 to about 10 seconds, and usually less than about 8 seconds. High temperature riser conversions, occurring at temperatures of at least 1,000 F. or higher and at 0.5 to 4 seconds hydrocarbon residence time in contact with the catalyst in the FCC riser, are desirable for some operations before initiating separation of vaporous hydrocarbon product materials from the catalyst. During the hydrocarbon conversion step, carbonaceous deposits accumulate on the catalyst particles and the particles entrain hydrocarbon vapors upon removal from the hydrocarbon conversion step. The entrained hydrocarbons are subjected to further contact with the catalyst until they are removed from the catalyst by mechanical means and/or stripping gas in a separate catalyst stripping zone. Hydrocarbon conversion products separated from the catalyst and stripped materials are combined and passed to a product fractionation step. Stripped catalyst containing deactivating amounts of carbonaceous material, hereinafter referred to as coke, is then passed to a catalyst regeneration operation.

Of particular interest has been the development of methods and systems for feeding oil, steam and catalyst into an FCC riser and improving the contact between the oil and catalyst to obtain uniform mixing as they travel up the FCC riser.

Various processes and mechanical means have been employed heretofore to feed steam, oil and catalyst to an FCC riser and improve the contact of the oil and catalyst. Several of these are discussed below.

Baumann et al, U.S. Pat. Nos. 3,261,776 and 3,353,925 disclose a process and apparatus, respectively, for feeding steam and catalyst into an FCC riser, mixing these streams with hydrocarbon feed and then passing the combination up the FCC riser. A series of single Venturi constricting zones are used to improve the mixing and contact of catalyst with the hydrocarbon feed and steam.

Griffel et al, U.S. Pat. No. 3,654,140, in a first embodiment, discloses a process which combines steam and oil, and then passes them across a valve and through a Venturi nozzle, and into an FCC riser where the steam and oil mix with catalyst. In a second embodiment, steam and oil are fed through concentric pipes into an FCC riser where the steam and oil mix with catalyst. The steam passes through the annulus between the inner and outer pipe, while oil passes through the inner pipe. Steam and oil rates are controlled by valves.

Snyder, Jr., U.S. Pat. No. 3,812,029 discloses a nozzle for injecting combined steam and catalyst into an FCC riser. The nozzle comprises concentric nozzles, which include an inner nozzle for oil and an outer nozzle for steam or water.

While each of the systems described above mix a catalyst and oil feed, there still remains a need for a system which obtains, as near as possible, a uniform ratio of catalyst to oil feed across the cross-section of a riser. The present invention is directed to filling this need.

SUMMARY OF THE INVENTION

It is a primary object of this invention to provide an improved method and apparatus for feeding oil, steam and catalyst to a fluid catalytic cracking (FCC) riser, which permits a greater degree of control over the distribution of oil and steam across the horizontal cross-section of the riser, to thereby promote a more uniform ratio of catalyst to oil feed across the riser.

It is another object of this invention to provide a method and apparatus for controlling the ratio of catalyst to oil feed across the horizontal cross-section of a riser by individually adjusting the oil and steam feed in each of a plurality of riser nozzles to attain and maintain a substantially isothermal temperature profile across the riser cross-section.

It is another object of this invention to provide an improved method and apparatus for feeding oil, steam and catalyst to a fluid catalytic cracking (FCC) riser which obtains an improved gasoline yield.

In its method aspects, the invention achieves the foregoing objects by an FCC method comprising the steps of passing catalyst from a catalyst feeder through a catalyst conduit into a lower portion of an FCC riser, passing oil from an oil header and steam from a steam header through each of a plurality of nozzles spaced about the lower portion of the riser, and separately controlling the flow rate of oil and steam into and through each nozzle to achieve a near uniform ratio of catalyst to oil across the riser cross-section.

The method may further include the step of measuring the temperature across the FCC riser cross-section at a position above the nozzles and adjusting the individual oil and steam flow rates until a near uniform isothermal temperature profile is achieved.

In its apparatus respects, the invention comprises a riser formed as a vertically disposed elongated tubular conduit having an upstream end and a downstream end, the upstream end terminating at a riser outlet; a means for feeding catalyst to the downstream end of the riser; a means for feeding oil and steam to each of a plurality of nozzles spaced about the downstream end of the riser; and, a means for individually controlling the flow rate of oil and steam into each of the nozzles to obtain a substantially uniform catalyst to oil distribution ratio across the horizontal cross-section of the riser. The controlling means is constructed as separate valves in each of the lines feeding steam and oil into a nozzle. A temperature sensing system is positioned in the riser upstream of the nozzles for monitoring the temperature across the riser cross-section as a measure of the catalyst to oil feed ratio within and across the riser.

BRIEF DESCRIPTION OF THE DRAWINGS

FIG. 3a is an illustration of the detail of one nozzle of the riser steam/oil distribution system;

FIG. 3b is an illustration of the detail of an oil header and the nozzles of the present invention;

FIG. 4 is an illustration of the detail of the connection of a steam line to an oil line;

FIG. 5 is an illustration of the detail of the steam and oil lines connected to the central nozzle;

DETAILED DESCRIPTION OF THE INVENTION

Figure 1:
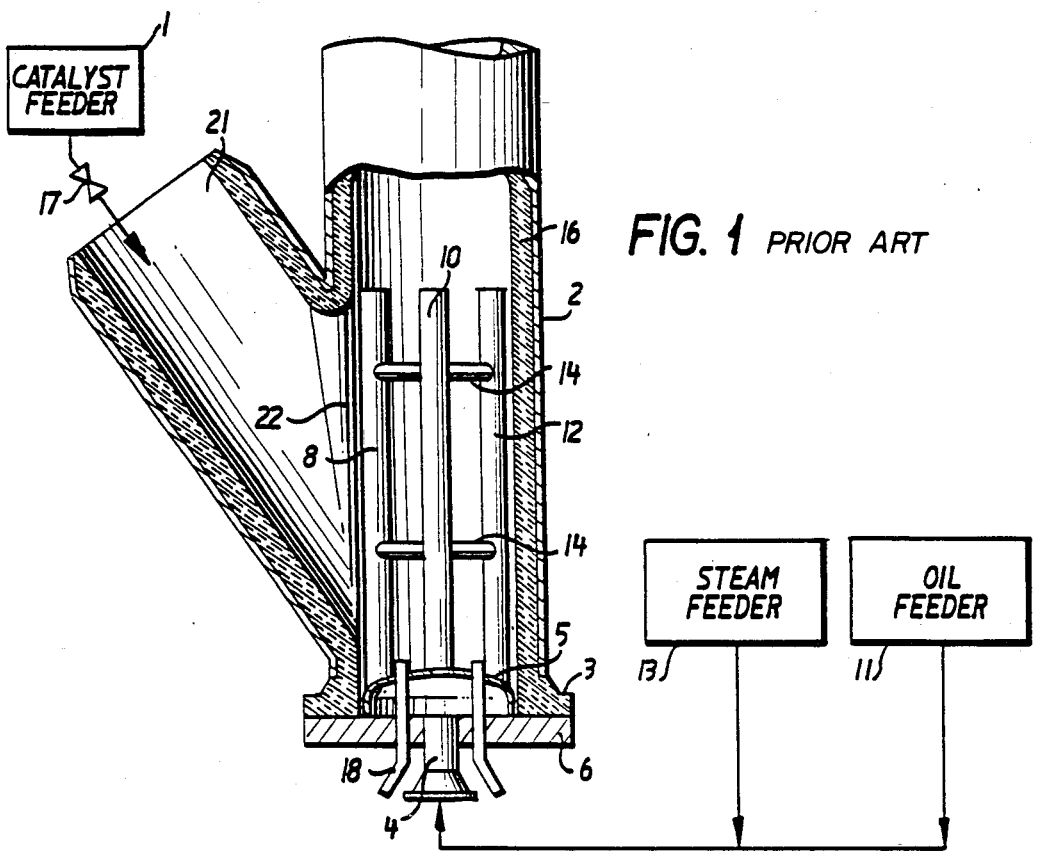
FIG. 1 is a schematic representation of a side view of a fluid catalytic cracking (FCC) riser steam/oil distribution system which has been commercially used in the art.

As well known, a fluid catalytic cracking (FCC) process employs a catalyst in the form of very fine particles which act as a fluid when aerated with a vapor. The fluidized catalyst is circulated continuously between a reaction zone and a regeneration zone and acts as a vehicle to transfer heat from the regenerator to the hydrocarbon feed and vapor. The FCC process is valuable to convert heavy hydrocarbons, e.g., oil, into more valuable gasoline and lighter products.

To better understand the invention, a known system for mixing catalyst and oil in a riser will first be described with reference to FIG. 1. The illustrated apparatus comprises feed nozzles 8, 10, 12, and others (not shown), which are connected to a plenum chamber 5. Liquid or gaseous hydrocarbon oil from an oil feeder 11 is mixed with steam from a steam feeder 13 and the mixture of oil and steam enters plenum chamber 5 through a central inlet pipe 4 in a bottom flange 6 of a riser 2. The combined stream passes from plenum chamber 5 through the nozzles 8, 10 and 12, and others not shown and enters the (FCC) riser 2 at a downstream end thereof. The riser 2 is lined with insulation 16, as conventional. Regenerated catalyst is fed from a catalyst feeder 1 (regeneration zone) through a slide valve 17 and into a catalyst conduit 21, which is connected at a catalyst port 22 to a lower portion of a side wall of the riser 2. Emergency steam nozzles 18 are located at the bottom of the riser to dislodge any catalyst plugs which may form. The bottom of the riser 2 is sealed by a plenum chamber flange 6 which is attached to the riser flange 3, also located at the bottom of the riser. The nozzles 8, 10 and 12, as well as those not shown, are substantially the same height, or slightly higher than, the catalyst port 22. Braces 14 are also provided to connect and support the nozzles 8, 10 and 12 and others. The catalyst is combined in the riser with the oil and steam exiting from the nozzles 8, 10, 12 and others and then travels comingled up toward the downstream end of the riser 2, which has its outlet attached to a reactor vessel (not shown).

Although the system illustrated in FIG. 1 has generally adequate mixing characteristics for oil and catalyst, the flow of oil and steam into the individual nozzles is uncontrollable and the oil flow is by no means uniform across the riser cross- section. This is particularly true for a two-phase oil feed. In addition, catalyst distribution across the riser, which is a function of catalyst flow rate, slide valve position and riser geometry is also difficult to control, producing areas in the riser of high and low catalyst to oil ratios.

The present invention is directed to providing individual oil and steam lines for each of the nozzles 8, 10, 12, etc. of the FIG. 1 system and providing means for controlling the flow of oil and steam through each line. By individually controlling the oil and steam rates in each nozzle, the catalyst to oil ratio can be more precisely controlled to obtain a more uniform catalyst/oil mixture across the horizntal cross-section of the riser 2 in order to optimize yields.

The invention will now be described in greater detail in connection with specific embodiments thereof, illustrated in FIGS. 2a–6b. These embodiments, however, are not to be construed as a limitation on the scope of the invention, but are merely provided by way of exemplary illustration. In FIGS. 2a–6b, elements having the same structure and function as elements in FIG. 1 are identified by the same reference numerals.

Figure 2A:
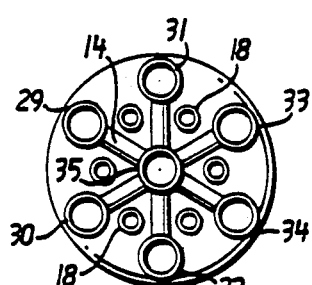
FIG. 2a is a schematic representation of a top view of a lower portion of a fluid catalytic cracking (FCC) riser steam/oil distribution system of the present invention.
Figure 2B:
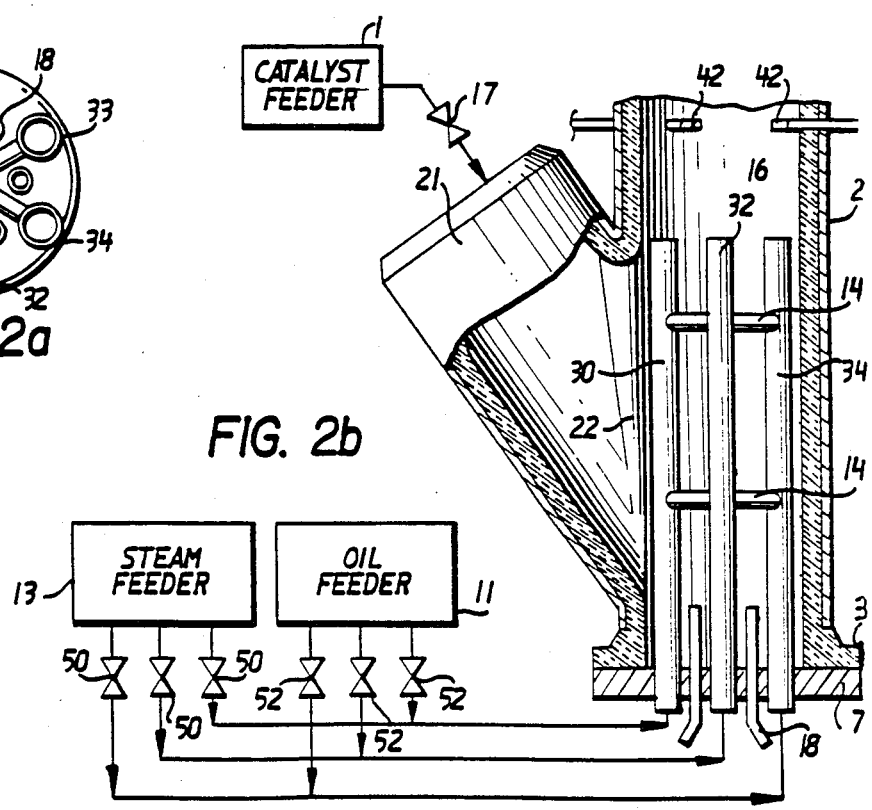
FIG. 2b is a schematic representation of a side view of a fluid catalytic cracking (FCC) riser steam/oil distribution system of the present invention.

Referring to FIGS. 2a and 2b the apparatus of the invention comprises a riser 2, lined with insulation 16 and provided at its lower portion with upstanding nozzles 29–35 and conventional emergency steam lines 18. The nozzles 29–35 are connected by braces 14 for support. The nozzles extend through a nozzle flange 7 at the bottom of riser 2 and into the riser 2. The nozzle flange 7 is attached to a riser flange 3 located at the bottom of the riser 2. The riser 2 is also provided with a catalyst conduit 21 and catalyst port 22, as described above with reference to FIG. 1. Catalyst flow rate from the catalyst feeder 1 into the catalyst conduit 21 is controlled by a slide valve 17. Steam from a steam feeder 13 passes through individual lines to each of the nozzles 29–35. An oil feeder 11 provides oil through individual oil lines to each of the nozzles 29–35. It should be appreciated that FIG. 2b shows the individual steam and oil lines for only the three nozzles 30, 32 and 34 illustrated, but oil and steam lines exist for each of the nozzles 29–35. Each oil and steam line has its own valve 50 or 52, respectively, to thereby individually control the steam oil flow rate into each of the nozzles 29–35.

Valves 50, 52 for each nozzle 29–35 can be individually adjusted in accordance with a determined catalyst distribution pattern to achieve a substantially uniform catalyst to oil ratio across the riser cross-section to improve yield selectivity and efficiency of hydrocarbon conversion. In order to determine how to adjust valves 50, 52 to achieve a substantially uniform catalyst to oil ratio, a temperature sensing system is employed to determine the temperature of the catalyst/oil/steam mixture at several places about a horizontal cross-sectional plane passing through the riser. For example, three thermocouples 42 (two shown) are located within the riser on substantially the same horizontal plane above the nozzles 31-35. The height above the nozzle is determined by process considerations and can be, for example, seven (7) feet for a commercial apparatus. The thermocouples 42 are supported by rods which pass through the reactor wall and can slide across the diameter of the reactor in order to measure temperatures at various points along the diameter. As in the FIG. 1 system, the height of the nozzles 29-35 is determined to be substantially the same as or slightly higher than the height of the catalyst entry port 22.

FIG. 3a shows how steam and oil respectively travel from a steam header 44 and an oil header 46 into a nozzle, such as nozzle 30. The piping shown is substantially the same as piping required for the other nozzles 29, 31-35. Oil header 46 (see also FIG. 3b) is connected to nozzle 30 by an oil conduit 58. Oil conduit 58 comprises a pipe 54 attached between oil header 46 and nozzle 30. An oil valve 52, which, for example, can be a globe valve, is connected in oil conduit 58 between an upstream elbow 60 which is attached to a length of straight pipe 62, and a straight pipe 54 from header 46. Pipe 62 is attached to an upstream elbow 64, which is attached to reducer 66, which ends in a flange 25 attached to nozzle flange 24.

As shown in FIG. 3b, oil feeds the oil header 46 through oil header inlet 72, which is attached to a side arm 74, which in turn is attached to a pair of reducers 76, each ending in flanges 78. The flanges 78 are respectively attached to flanges 80 of elbows 82, which are attached to respective pipe lengths 83 and in turn attached to a series of pipe lengths 84, each of which has an oil header outlet 86 for nozzles 29-34. Nozzle 35 is fed by oil from center oil header outlet 88. Steam is fed from the steam header 44, through a steam line 70, upwardly into oil conduit 58 at the bend in elbow 64, as shown in FIG. 3a. Line 70 is attached to steam valve 50, which, for example, can be a globe valve, and the steam valve 50 is in turn attached to steam line 68 which is attached to elbow 64 of the oil conduit 58. FIG. 4 shows how steam line 68 passes directly into the elbow 64.

The steam header 44 is substantially the same as oil header 46, shown in FIG. 3b, and is therefor not illustrated; however, the steam header 44 is normally formed of smaller diameter components than oil header 46. It should be appreciated that the precise shape and configuration of steam header 44 and oil header 46 is not critical to the invention and that other shapes and configurations can be employed.

FIG. 5 shows the arrangement used to feed oil and steam to central nozzle 35. The oil header 46 is attached to center oil header outlet 88, which is connected to flange 90, which in turn is connected to flange 92 of pipe 95. Pipe 95 is connected to elbow 96, which is connected to pipe 54, which is, in turn, attached to oil valve 52. Oil valve 52 is connected to upstream elbow 60, which is connected to pipe 62, which is in turn connected to downstream elbow 64. Elbow 64 is attached to reducer 66, which has a flange 25 which connects to flange 24 of nozzle 35. The steam header 44 is connected by steam conduit 98 to the oil conduit 95. Steam header 44 is attached to a straight pipe 100, which is attached to elbow 102. Elbow 102 is in turn attached to pipe 104, which is attached to steam valve 50. Steam valve 50 is attached to pipe 68, which is attached into the center portion of elbow 64, in substantially the same manner as shown in FIG. 4.

Oil passes from the header 46 through outlets 86 into conduits 58, which feed nozzles 29-34. Oil also flows from header 46 through center outlet 88, conduit 95 and enters center nozzle 35. Steam passes from the steam header 44 through steam lines 70, valves 50 and into the oil conduits 58, into nozzles 29-34 and into the riser 2. Steam also passes from the steam header 44 from a center outlet (not shown) into steam conduit 98, into an elbow 64 of oil conduit 95 and then into center nozzle 35.

The system illustrated in FIGS. 2a-5b operates as follows. Regenerated catalyst passes from the catalyst feeder 1 (regeneration zone) through slide valve 17 into catalyst conduit 21, through catalyst port 22 and into the riser 2. In the riser, catalyst blends with the oil and steam exiting from nozzles 29-35 and the combination passes vertically upwards to the downstream end of the riser 2 and exits into a well-known FCC reactor (not shown). The catalyst distribution is determined by its flow rate, the slide valve 17 position and riser geometry. However, the catalyst to oil ratio in the riser can be controlled to be substantially uniform across the riser cross-section by means of the valves 50, 52 respectively provided in the oil and steam feed path into each of the nozzles 29-35. The temperature over the riser cross-section is used as an indicator of a uniform catalyst to oil ratio. Thus, the temperature of the combined catalyst, oil and steam stream is measured by thermocouples 42 located on substantially the same horizontal plane above nozzles 29-35 outlets. There are, for example, three thermocouples 42 (two are shown in FIG. 2b), as described above, which are slidable across the diameter of the riser 2. The three thermoocouple slide rods are spaced apart by 60. By sliding the thermocouple rods through the riser wall, the temperature measurements of the combined stream can be taken at various locations across the riser diameter. Representative measurement points are illustrated by small circles 110 in FIG. 6a. It is desirable to maintain a substantially isothermal temperature profile across the cross-section of the riser 2, which corresponds to a substantially uniform catalyst to oil ratio. In order to achieve this isothermal profile, the flow rates of steam and/or oil are adjusted by valves 50 or 52, respectively, for each nozzle and then temperature measurements are made, after which the steam and oil rates are again adjusted and temperature measurements again taken, with this sequence being repeated until a substantially isothermal temperature profile is achieved.

Figure 6A:
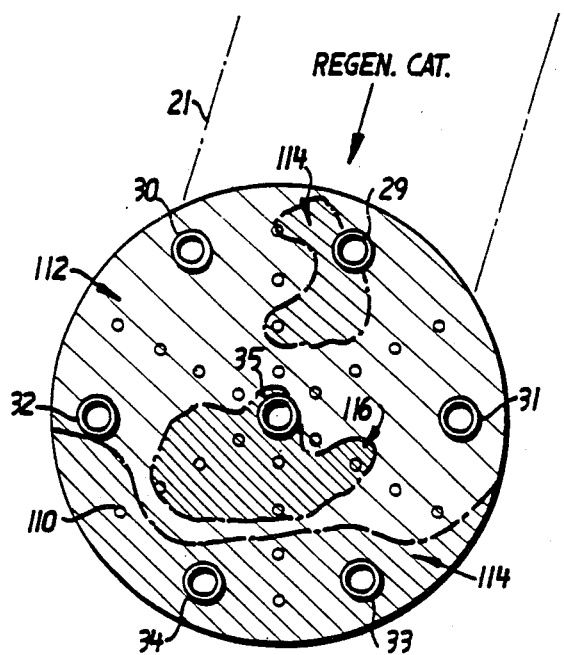
FIG. 6a is a top view of the riser showing a typical temperature profile obtained with the invention and with all control valves open.
Figure 6B:
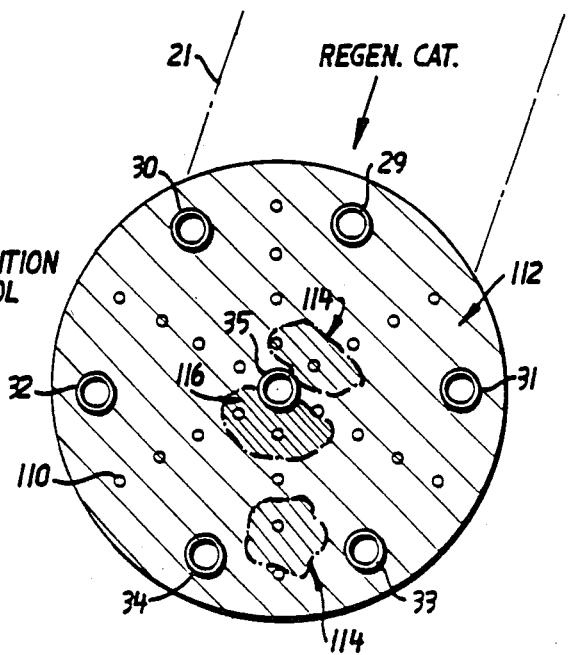
FIG. 6b is a top view of the riser showing a typical temperature profile obtained with the invention and with all control valves adjusted to produce an optimum operating condition.

FIG. 6a illustrates a temperature profile across the riser when the valves 50, 52 are wide open (unadjusted) for each of nozzles 29-35. The temperature gradients are shown by numerals 112, 114 and 116. Numeral 112 represents an area of average temperature T-average −50 F.; numeral 114 represents an area of temperature 50-150 F. below T-average; and numeral 116 represents an area of temperature which is 50-150 F. above T-average. FIG. 6b shows the substantially isothermal profile across the riser cross-section, which can be achieved by repeatedly taking temperature measurements and adjusting the valves 50, 52 for each of the nozzles 29-35, as described above.

A yield comparison is provided below to show the improvements obtained by use of the present invention over the yield obtainable with the FIG. 1 system. Although minor variations in reaction conditions occurred in running the FIG. 1 system and system of the invention, e.g., slightly different feedstock, activity levels for the catalyst and operating conditions, these slight differences were normalized for constant C4-production and for consaant coke production to produce a table of comparable yields of the two systems. The table shows that more gasoline is produced with the feed nozzle system of the invention at the expense of light and heavy cycle oil, resulting in a significant increase in conversion. Total C4-yields remain relatively constant.

|  | FIG. 1 System (NORMALIZED) | | The Invention |
|---|---|---|---|
|  | Normalized Base at Const. C4— | Normalized Base at Const. Coke | Optimized New Nozzle |
| Conditions |  |  |  |
| Cat/Oil | 5.9 | 5.7 | 5.9 |
| Riser Top Temp., F. | 983.0 | 983.0 | 983.0 |
| Oil-to-Riser Temp., F. | 295.0 | 313.0 | 318.0 |
| Regen. Temp., F. | 1276.0 | 1278.0 | 1268.0 |
| Yields, Vol. % |  |  |  |
| Conversion | 58.8 | 57.8 | 61.7 |
| Gasoline | 43.5 | 42.8 | 47.8 |
| LCO | 29.9 | 30.6 | 27.7 |
| HCO | 11.3 | 11.6 | 10.6 |
| C$_4$'s | 9.2 | 8.9 | 9.4 |
| C$_3$'s | 7.3 | 7.1 | 7.8 |
| C$_2$ & Lighter, wt. % | 4.3 | 4.3 | 3.9 |
| Coke, wt. % | 5.7 | 5.6 | 5.6 |
| Gasoline + Distillate | 73.4 | 73.4 | 75.5 |
| Gasoline + Potential Alkylate | 63.5 | 62.2 | 67.5 |

While specific embodiments of the method and appartus aspects of the invention have been shown and described, it should be apparent that many modifications can be made thereto without departing from the spirit and scope of the invention. Accordingly, the invention is not limited by the foregoing description, but is only limited by the scope of the claims appended hereto.

What is claimed is:

1. An apparatus for feeding oil, steam and catalyst to a riser for the fluid catalytic cracking of a hydrocarbon feed comprising:
   a riser formed as a vertically disposed elongated tubular conduit having an upstream end and a downstream end, said upstream end feeding into a reactor vessel;
   a plurality of upwardly extending nozzles spaced about a lower portion of said riser;
   means for feeding catalyst to said downstream end of the riser;
   means for feeding oil and steam into a lower end of each of said nozzles; and
   means for separately controlling the flow rate of oil and steam into each of said nozzles independent of the flow rate of oil and steam into others of said nozzles to obtain a substantially uniform catalyst to oil ratio across a crosssection of said riser.

2. An apparatus of claim 1, wherein said controlling means comprises respective flow control valves for an oil feed line and a steam feed line for each of said nozzles.

3. An apparatus of claim 2, wherein the oil feed lines for said nozzles are connected to a common oil header and the steam feed lines for said nozzles are connected to a common steam header.

4. An apparatus of claim 2, further comprising means for measuring the temperature across a horizontal cross-section of the riser.

5. An apparatus of claim 4, wherein said temperature measuring means comprises at least one thermocouple positioned above said nozzles which is movable across said horizontal cross-section.

6. The appatatus of claim 4, whereby said nozzles are controllable in response to readings of said thermocouple.

* * * * *